(12) United States Patent
Maffei

(10) Patent No.: US 7,736,411 B2
(45) Date of Patent: Jun. 15, 2010

(54) RENEWABLE PROCESS FOR MANUFACTURING GROUND AND SOIL TREATMENT COMPOUNDS USING PLANT BY-PRODUCTS

(76) Inventor: Michael Maffei, 9606 Entiat River Rd., Entiat, WA (US) 98822

( * ) Notice: Subject to any disclaimer, the term of this patent is extended or adjusted under 35 U.S.C. 154(b) by 1012 days.

(21) Appl. No.: 11/441,750

(22) Filed: May 26, 2006

(65) Prior Publication Data

US 2008/0072793 A1  Mar. 27, 2008

(51) Int. Cl.
 C05F 7/00 (2006.01)
 C05F 11/00 (2006.01)
 C09K 3/14 (2006.01)
 C09K 3/18 (2006.01)

(52) U.S. Cl. .................. 71/25; 71/23; 106/13; 106/36; 106/900; 252/70

(58) Field of Classification Search .................. 103/13, 103/900, 36; 252/70; 71/23, 25
See application file for complete search history.

(56) References Cited

U.S. PATENT DOCUMENTS

| | | | |
|---|---|---|---|
| 1,330,115 A * | 2/1920 | Monroe ..................... | 291/3 |
| 2,410,910 A | 11/1946 | Wait | |
| 3,412,030 A | 11/1968 | Wahlberg | |
| 3,712,802 A | 1/1973 | Grybek et al. | |
| 4,664,832 A | 5/1987 | Sandvig et al. | |
| 4,676,918 A | 6/1987 | Toth et al. | |
| 5,709,813 A | 1/1998 | Janke | |
| 5,965,058 A | 10/1999 | Janke | |
| 6,156,226 A | 12/2000 | Klyosov et al. | |
| 6,416,684 B1 | 7/2002 | Bloomer | |
| 6,881,008 B1 * | 4/2005 | Maile et al. ............... | 405/128.5 |

FOREIGN PATENT DOCUMENTS

WO  WO-9940163 A1 *  8/1999

OTHER PUBLICATIONS

Risse, Mark and Harris, Glen, "Best Management Practices for Wood Ash Used as an Agricultural Soil Amendment", http://pubs.caes.uga.edu/caespubs/pubcd/B1142.htm, Jun. 15, 2006.
Risse, Mark and Harris, Glen, "Best Management Practices for Wood Ash Used as an Agricultural Soil Amendment", www.hubcap.clemson.edu/~blpprt/bestwoodas, viewed Oct. 28, 2005.

(Continued)

*Primary Examiner*—Jerry Lorengo
*Assistant Examiner*—Kevin M Johnson
(74) *Attorney, Agent, or Firm*—Michelle Bos

(57) ABSTRACT

The invention relates to a renewable process for manufacturing ground and soil treatment compounds using plant by-products. The invention further relates to products of that process, including an anti-slip compound for use on snow- or ice-covered surfaces, and to a related fertilizer compound for improving plant growth. The described compounds primarily comprise organic by-products of timber processing operations. In addition, the invention relates to a renewable energy and resource process.

3 Claims, 1 Drawing Sheet

OTHER PUBLICATIONS

Misra, Mahendra K. et al., "Wood Ash Composition as a Function of Furnace Temperature", Biomass & Bioenergy, vol. 4, No. 2, pp. 103-116, 1993 Pergamon Press, Great Britain.

Pitman, Rona, "Wood Ash Use in Forestry—A Review of the Environmental Impacts", source and date unknown.

U.K. Forestry Commission, "Application of Wood Ash to Forestry", www.forestresearch.gov.uk/website/forestresearch.nsf/ByUnique/INFD-626BG5, Jun. 15, 2006.

U.S. Dept of Energy and U.S. Dept of Agriculture, "Biomass as Feedstock for a Bioenergy and Bioproducts Industry", Apr. 2005.

* cited by examiner

RENEWABLE PROCESS FOR MANUFACTURING GROUND AND SOIL TREATMENT COMPOUNDS USING PLANT BY-PRODUCTS

CROSS-REFERENCE TO RELATED APPLICATIONS

Not applicable

STATEMENT REGARDING FEDERALLY SPONSORED RESEARCH OR DEVELOPMENT

Not applicable

NAMES OF PARTIES TO JOINT RESEARCH AGREEMENT

Not applicable

BACKGROUND OF THE INVENTION

1. Field of the Invention

The invention relates to a renewable process for manufacturing ground and soil treatment compounds using plant by-products. The invention further relates to products of that process, including an anti-slip compound for use on snow- or ice-covered surfaces, or in any location where improved traction is desirable for pedestrian and traffic safety, and to a related fertilizer compound for improving plant growth. The described compounds primarily comprise organic by-products of timber processing operations. In addition, the invention relates to a renewable energy and resource process.

2. Description of Related Art

The need for anti-slip compounds is generally well-known in areas where winter weather brings precipitation and low temperatures. Ice- and snow-covered surfaces are a potential hazard for pedestrian and vehicular traffic, leading to injuries, property damage, traffic delays and blockages. In recognition of this hazard, many products have been developed to provide friction on slippery surfaces, or to melt accumulated ice or snow, or both.

One class of products that has been developed to treat ice- and snow-covered surfaces is deicers. Chemical deicers in either liquid or solid form are applied to road surfaces to melt surface ice and improve traction. While effective in removing ice, some salt-based chemical deicers are undesirable for long term use because of their corrosive properties. Furthermore, many chemical deicers have an adverse impact on the environment in which they are applied.

Another class of products that is used to treat ice- and snow-covered surfaces is abrasive materials. Substances such as sand, gravel, cinders and the like are commonly spread on ice- and snow-covered surfaces to provide improved traction for pedestrian and vehicular traffic.

Combinations of chemical deicers and abrasive materials are also well known in the treatment of snow and ice covered surfaces. U.S. Pat. No. 2,410,910 to Wait for "Material for Providing Traction" describes a method for making a traction-providing material, involving the impregnation of an insoluble porous particulate material with an aqueous salt solution. The more recent U.S. Pat. No. 5,965,058 to Janke et al. for "Deicing Composition and Method" discloses a deicing composition formed from steepwater solids, a byproduct from the wet milling of corn. In an embodiment of the '058 invention, traction-providing material such as sand or sawdust is added to the deicing composition.

The use of fertilizers to enhance plant growth is well established in modern agriculture. Myriad mixtures of beneficial soil amendments are available commercially, including those comprising primarily organic ingredients. It has been recognized for centuries that, when mixed with soil, ash provides a variety of major and minor elements necessary for plant growth. Likewise, the use of sawdust as a soil amendment or mulch is well known.

DETAILED DESCRIPTION OF THE INVENTION

Figure 1:
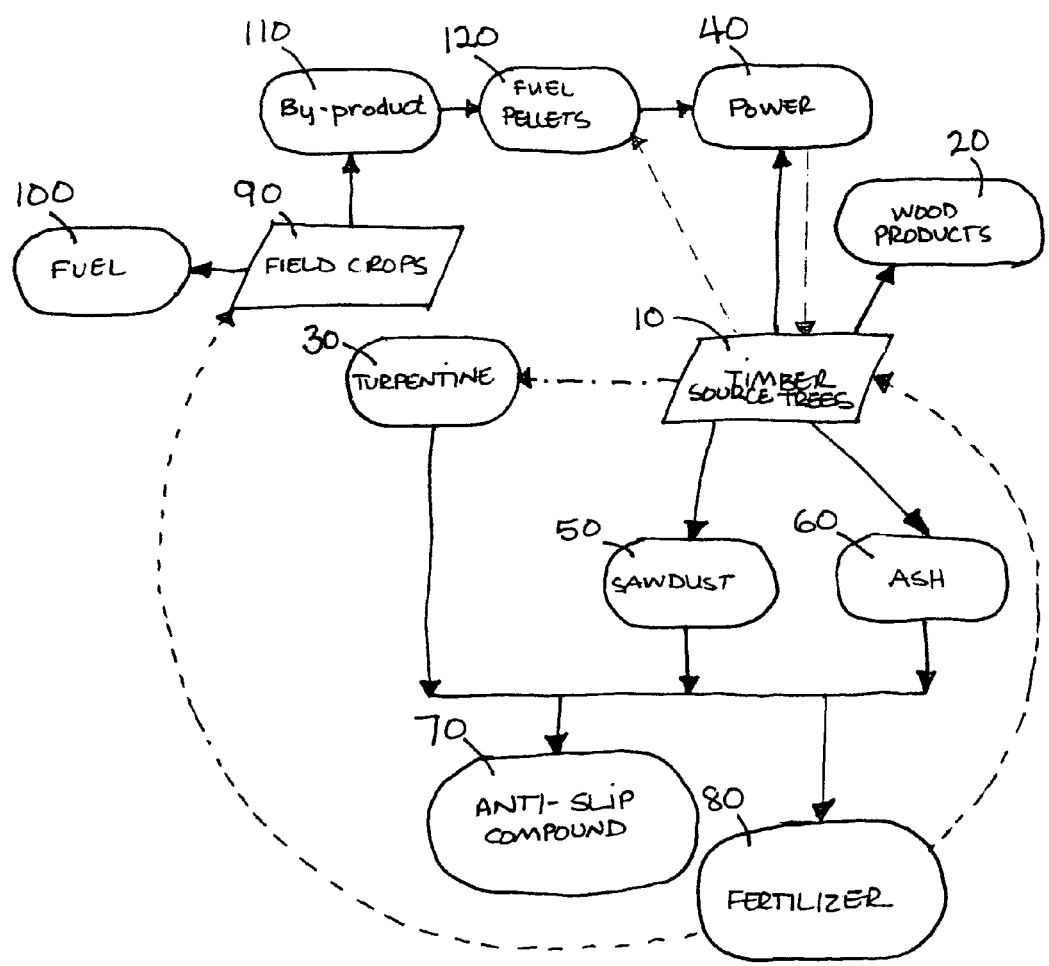
FIG. 1 is a flow chart showing an embodiment of the present invention.

The present invention provides an environmentally friendly soil and ground treatment compound useful for providing friction to slippery surfaces, and for fertilizing trees and other plants. In general, the compound comprises a wood product particulate, wood ash, and a moisture source.

Sawdust from timber milling or processing operations is an excellent source of wood product particulate. Timber mills and manufacturing facilities produce sawdust as a by-product in the processing or manufacturing of traditional forest products. Sawdust is used in pulp and paper milling, pellets for pellet stoves, animal bedding, and fuel for energy and heat generation, but environmentally responsible disposal of excess sawdust often remains an issue for owners and operators of timber mills and manufacturing facilities. In light of its availability and low procurement cost, sawdust is a preferred wood product particulate according to the present invention.

Wood ash, like sawdust, is generated as a byproduct of an industrial process. Industrial combustion of wood for the generation of power results in production of wood ash, which is often used as a soil amendment or disposed of in landfills. Wood ash is readily available, often at or near sources of wood product particulate such as sawdust.

According to the invention, a quantity of wood product particulate is mixed with a quantity of wood ash. In an embodiment, the wood product particulate is first exposed to a moisture source to lightly moisten the surface of the wood product particulate. The addition of moisture to the wood product particulate results in adhesion of the wood ash to the surface of the wood product particulate, which aids in the homogeneous mixing of the wood ash and the wood product particulate. By way of example but not limitation, moisture treatment of the wood product particulate can be accomplished by briefly exposing the wood product particulate to a vapor or mist source. Excessive exposure to moisture can result in formation of mold on the wood product particulate, while insufficient moisture can lead to non-homogeneous mixing of the wood product particulate and the wood ash. In a preferred embodiment, the wood product particulate is treated at a rate of two gallons of a moisture source to 5.5 tons of wood product particulate (approximately 7.5 liters per 5 metric tons).

In an embodiment of the invention, the moisture source to which the wood product particulate is exposed is water, preferably in the form of vapor or mist. In an alternative embodiment, the moisture source is a dilute solution of turpentine in water. The addition of turpentine to the moisture source improves adhesion of the wood ash to the wood product particulate. A solution containing about three percent to ten percent (3% to 10%) turpentine by volume produces the desired effect. Most preferably, the dilute turpentine solution contains approximately five percent to ten percent (5% to 10%) turpentine by volume.

According to the invention, after the wood product particulate is exposed to a moisture source, it is combined with a quantity of wood ash. Preferably, the moisture treated wood product particulate and the wood ash are mixed in a ratio of approximately eighty percent to ninety percent (80% to 90%) wood product particulate to approximately ten to twenty percent (10% to 20%) wood ash by volume. Wood product particulate and ash mixed in these ratios are effective in producing the desired result of providing improved traction on ice- or snow-covered surfaces, and providing enhanced growth of trees and other plants. The compound is particularly useful as an anti-slip compound when mixed at a ratio of eighty-five percent (85%) wood product particulate to fifteen percent (15%) wood ash. A compound having a ratio of eighty percent (80%) wood product particulate to twenty percent (20%) wood ash has been proven to be particularly effective as a fertilizer.

In an embodiment, the present invention provides an environmentally responsible method for improving traction on ice- or snow-covered surfaces. The method includes the steps of obtaining a wood product particulate; exposing the wood product particulate to a moisture source; mixing the moisture treated wood product particulate with a quantity of wood ash; and applying the resulting compound to ice- or snow-covered surfaces by mechanical or manual means. The anti-slip compound is particularly advantageous when used in environmentally sensitive areas. Because the anti-slip compound consists primarily of plant byproducts, it is harmless to plant growth and wildlife. The absence of inorganic salts is also an advantage, in that use of the anti-slip compound does not result in corrosion of surfaces with which the compound comes in contact.

In a further embodiment, the present invention provides a method for improving traction on ice- or snow-covered surfaces and providing a nutrient source for surrounding vegetation. The method includes the steps of obtaining a wood product particulate; exposing the wood product particulate to a moisture source; mixing the moisture treated wood product particulate with a quantity of wood ash; and applying the resulting compound to ice- or snow-covered surfaces and surrounding vegetation by mechanical or manual means.

In a further embodiment, the present invention provides a method for fertilizing plants. The method includes the steps of obtaining a wood product particulate; exposing the wood product particulate to a moisture source; mixing the moisture treated wood product particulate with a quantity of wood ash; and applying the resulting compound to the soil surrounding trees and other plants by mechanical or manual means. The inventor has achieved particular success using the compound to promote rapid growth of pine trees in low water areas.

The compound described above, as well as its uses and methods of manufacture, are part of a larger, environmentally sustainable process, as depicted in FIG. 1. According to the process, a timber processing operation processes timber 10 to produce wood products 20 for distribution and sale. Turpentine 30 is an additional downstream product of the timber processing operation 10. Combustion of timber generates power 40. By-products of the timber processing operation 10 include sawdust 50 and ash 60. The compound of the present invention described above, in the form of an anti-slip compound 70 or fertilizer 80 can be manufactured from the sawdust 40, ash 50 and turpentine 30 produced as products or by-products of the timber processing operation 10. The anti-slip compound 70 produced by the process is used to improve traction on snow- and ice-covered surfaces. The fertilizer 80 produced by the process is used to fertilize plants, and is cycled back into the process by fertilizing the timber 10 used in the timber processing operation.

According to the process of the invention, the fertilizer 80 is additionally used to promote growth and increase yield of field crops 90 such as wheat and other crops used in the production of renewable fuels 100 such as ethanol and biodiesel. The production of fuel from plant matter results in the production of a plant matter by-product 110, which is pelletized and dried to create fuel pellets 120. The fuel pellets 120 are distributed and sold, and are also re-introduced in the cycle as a fuel source for the production of power 40.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. An environmentally friendly soil and ground treatment compound, wherein the compound is useful as an anti-slip compound, the compound comprising:
   a wood product particulate;
   wood ash; and
   a moisture source,
   wherein the compound comprises approximately 85% by volume wood product particulate and approximately 15% by volume wood ash, and wherein the moisture source comprises a solution of water and turpentine comprising approximately 5% turpentine by volume.

2. An environmentally friendly soil and ground treatment compound, wherein the compound is useful as a plant fertilizer, the compound comprising:
   a wood product particulate;
   wood ash; and
   a moisture source,
   wherein the compound comprises approximately 80% by volume wood product particulate and approximately 20% by volume wood ash, and wherein the moisture source comprises a solution of water and turpentine comprising approximately 5% turpentine by volume.

3. An environmentally friendly soil and ground treatment compound, the compound comprising:
   a wood product particulate;
   wood ash; and
   a moisture source,
   wherein the compound comprises approximately 80% to 90% by volume wood product particulate and approximately 10% to 20% by volume wood ash, and wherein the moisture source comprises a solution of water and turpentine comprising approximately 3% to 10% turpentine by volume.

* * * * *